US007352705B1

(12) United States Patent
Adhikari et al.

(10) Patent No.: US 7,352,705 B1
(45) Date of Patent: Apr. 1, 2008

(54) METHOD AND APPARATUS FOR DETERMINING ENDPOINTS FOR USE AS TESTING DEVICES

(75) Inventors: Akshay Arun Adhikari, Basking Ridge, NJ (US); Karen Louise Barrett, Chatswood (AU); Lorraine Denby, Berkeley Heights, NJ (US); Neil Hepworth, Artarmon (AU); Jean Meloche, Madison, NJ (US)

(73) Assignee: Avaya Technology Corp., Basking Ridge, NJ (US)

( * ) Notice: Subject to any disclaimer, the term of this patent is extended or adjusted under 35 U.S.C. 154(b) by 741 days.

(21) Appl. No.: 10/933,646

(22) Filed: Sep. 3, 2004

(51) Int. Cl.
*G06F 11/00* (2006.01)
(52) U.S. Cl. ...................... 370/248; 370/242
(58) Field of Classification Search ........ 370/216–228, 370/241–258, 338
See application file for complete search history.

(56) References Cited

U.S. PATENT DOCUMENTS 7,237,138 B2 * 6/2007 Greenwald et al. ............ 714/4

2003/0120811 A1 * 6/2003 Hanson et al. ............... 709/245
2004/0078683 A1 * 4/2004 Buia et al. ..................... 714/37

* cited by examiner

*Primary Examiner*—Chi Pham
*Assistant Examiner*—Thai Hoang
(74) *Attorney, Agent, or Firm*—John C. Moran

(57) ABSTRACT

A method and apparatus for testing a digital network having a plurality of subnetworks by determining by one of a plurality of user endpoint devices assigned to one of the plurality of subnetworks upon the one of the plurality of user endpoint devices being idle that the one of the plurality of user endpoint devices should perform the functions of a testing user endpoint device for the one of the plurality of subnetworks; identifying the one of plurality of user endpoint devices to a server or a distributed system of servers as a testing user endpoint device; obtaining the identifies of other testing user endpoint devices in other ones of the plurality of subnetworks from the server; and testing the network by transmission of test packets to other ones of the testing user endpoint devices in the other ones of the plurality of subnetworks.

46 Claims, 6 Drawing Sheets

METHOD AND APPARATUS FOR DETERMINING ENDPOINTS FOR USE AS TESTING DEVICES

TECHNICAL FIELD

This invention relates to data transmission, and, in particular, to the testing of data transmission networks.

BACKGROUND OF THE INVENTION

In packet switching networks that are utilized for application requiring a high reliability, there is the need to maintain such packet switching networks at a high degree of reliability. It is important that network managers who are responsible for such packet switching networks be aware of potential network problems at all times. Often, such networks are not used during certain periods of the day. An excellent example of this is a packet switching network utilized for the communication of VoIP calls. During the night such a network will have limited if any call activity. A network problem occurring during the night that would disable communication via the network between switching domains would not be discovered until the following day when employees or other individuals would be attempting to utilize the packet switching network. The protocol that is utilized by many VoIP type protocols has the capability of monitoring the network using techniques such as RTCP (real-time transport control protocol) packets. However, RTCP packets are only sent between active endpoints. In periods, when the endpoints are idle, no traffic is sent. In addition, the intervals of communication between various domains may vary with time with one domain not having communication with another domain except for certain times of the day. Normally, a domain composes a plurality of endpoints that may be IP telephones, soft phones, or other devices interconnected by a LAN.

One solution that has been utilized in the prior art is to have all idle IP endpoints generate calls throughout the network to verify communications to all domains by faking VoIP calls and allowing the use of RTCP packets. The problem with this prior art solution is that it degrades the performance of the network since it generates an excessive amount of traffic. A second method that has been utilized within the prior art is to designate individual IP endpoints on each LAN/domain to function as network probes for that LAN. A network probe is simply an IP endpoint that is generating traffic to perform testing. The problem with this second method is that if the IP endpoint becomes engaged in an actual call it is no longer generating traffic throughout the network. Normally an IP endpoint being used as a probe would generate traffic to all of the other domains of the network. However, when an IP endpoint is engage in a call, it only deals with one other endpoint located in a particular domain.

SUMMARY OF THE INVENTION

A method and apparatus for testing a digital network having a plurality of subnetworks by determining by one of a plurality of user endpoint devices assigned to one of the plurality of subnetworks upon the one of the plurality of user endpoint devices being idle that the one of the plurality of user endpoint devices should perform the functions of a testing user endpoint device for the one of the plurality of subnetworks; identifying the one of plurality of user endpoint devices to a server or a distributed system of servers as a testing user endpoint device; obtaining the identifies of other testing user endpoint devices in other ones of the plurality of subnetworks from the server; and testing the network by transmission of test packets to other ones of the testing user endpoint devices in the other ones of the plurality of subnetworks.

DETAILED DESCRIPTION

Figure 1:
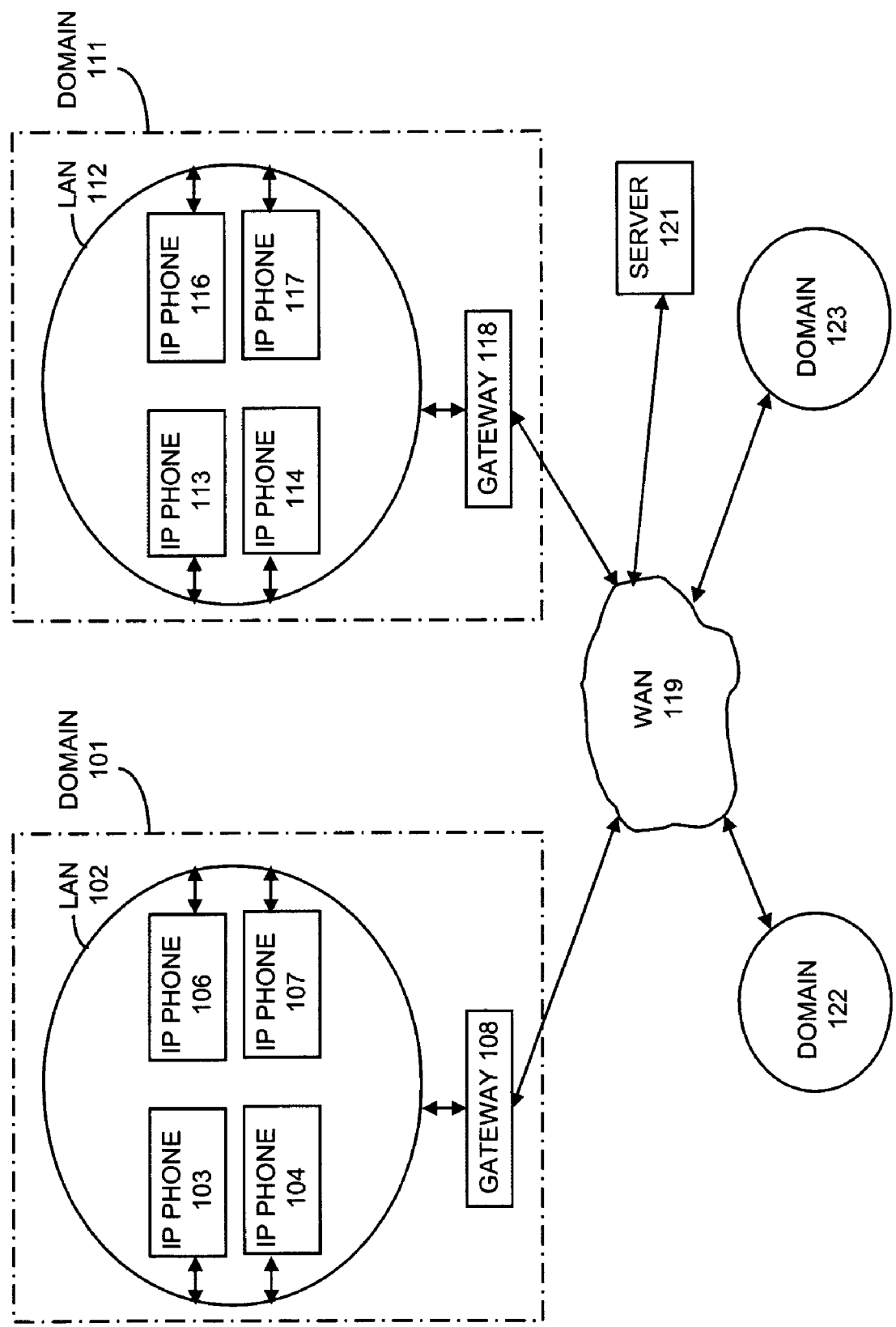
FIG. 1 illustrates an embodiment for implementing the invention.

FIG. 1 illustrates an embodiment for implementing the invention. FIG. 1 illustrates domains 101, 111, 122, and 123 (which are subnetworks) being interconnected via wide-area network (WAN) 119. One skilled in the art would readily realize that other types of digital networks could also be used. One skilled in the art would readily realize that there could be more domains and within a domain, there could be more IP phones. Although IP phones are illustrated in FIG. 1, these devices could be any user endpoint device capable of communicating either voice or video information. Domain 101 comprises LAN 102 which provides inter-domain communication for IP phones 103-107. Communication outside of domain 101 is provided by gateway 108 which interconnects to WAN 119. Domain 111 similarly comprises elements 112-118. Domains 122 and 123 have a similar makeup. Server 121 provides overall control of the testing of WAN 119 by endpoints such as endpoint IP phone 103 in domain 101. One skilled in the art would envision that server 121 could also be a one of a distributed system of servers. In the embodiment of the invention, one or more IP phones within a domain become probes and transmit traffic to probes in the other domains and then, in one embodiment, utilize RTCP packets to determine the state of the paths via WAN 119 to the different domains. Other embodiments would use testing techniques such as traceroute, pinging, RTP, SIP, pinging, H323 or any other testing techniques well know to those skilled in the art. Within a domain, the idle IP phones negotiate which of the idle IP phones will become the probes. In one embodiment, only IP phones not engaged in an active telecommunication call will attempt to become a probe. In another embodiment, only one IP phone per domain will be a probe, and it will be an idle phone. When a probe becomes active on a call, it then broadcasts to the other IP phones within the domain the fact that it is going active and no longer will be a probe. This allows the other IP phones to negotiate among themselves which will become the probe. In yet another embodiment, a plurality of IP phones can be probes within one domain with the maximum number of probes per domain being less then the total number of IP phones within the domain.

When an IP phone becomes a probe, it transmits a message to server 121 informing server 121 that it is a probe. In one embodiment, the IP phone that has just become a probe will request the identities of the other probes in the other domains from server 121. In another embodiment, server 121 will transmit test information defining the domains to be tested, the schedule of the tests, and the schedule that the probe will report test results back to server 121 along with the identities of the other probes. In yet another embodiment, server 121 periodically transmits identities of the probes in other domains to each of the probes in the various domains. Once a probe has identified itself to server 121 and has received the identity of the other probes in other domains (and may also receive test information from server 121 in one embodiment), it begins to transmit dummy packets to the other probes utilizing the RTP packets. Periodically, each probe transmits RTCP packets to determine the state of the network interconnecting the probe to the various domains. (Other embodiments would use testing techniques such as traceroute, RTP, pinging, SIP, H323 or any other testing techniques well know to those skilled in the art to do determine the state of the network.) In one embodiment of the invention, the probes periodically report the state of the network to server 121. If a probe fails to report, server 121 can determine that that particular domain may no longer be active or that the WAN has failed to create a path.

Although FIG. 1 illustrates only server 121 for performing the functions of providing overall control, other embodiments would have a plurality of servers performing this function with the servers communicating among themselves the necessary information.

To better understand the operations of the various embodiments consider the following example with respect to FIG. 1. IP phone 103 finishes an active call. After waiting a first predefined time, which for the sake of this example is 30 seconds, IP phone 103 transmits a broadcast message to the other IP phones in domain 101 that in essence says that IP phone 103 is idle and giving its ID number. The ID number hashed from its MAC address. One skilled in the art could envision other operations to generate the unique ID. Other idle IP phones, namely IP phones 104-107, would respond with their ID numbers if they were also idle. If IP phone 103 has the lowest ID number of any of the idle IP phones in domain 101, it will become the probe for domain 101. In one embodiment, IP phone 103 will become the probe even if IP phone 107 was already currently the probe. In another embodiment, the IP phone that is already the probe will not give up being the probe to another idle IP phone having a lower ID number. Assuming that IP phone 103 becomes the probe, it transmits a message to server 121 informing server 121 that it is the probe for domain 101. In other embodiments, there can be multiple probes within a domain. The message transmitted to server 121 by IP phone 103 may request the identity of the other probes in domains 111, 122, and 123. In one embodiment, server 121 will transmit test information defining the domains to be tested, the schedule of the tests, and the schedule that the probe will report test results back to server 121 along with the identities of the other probes. In one embodiment, server 121 periodically transmits the identity of the various probes in the various domains, and all of the idle phones record these identities on the chance that they may become the probe for their domain.

Once IP phone 103 has the identities of the other probes in the other domains and may also have received test information from server 121, it commences to transmit RTP packets to these other IP phones and periodically utilizes RTCP packets to determine the various network conditions that affect the transmission of packets. (Other embodiments would use testing techniques such as traceroute, RTP, SIP, pinging, H323 or any other testing techniques well know to those skilled in the art to do determine the state of the network.) At periodic intervals, IP phone 103 transmits the state of the paths to the different domains to server 121. In one embodiment, server 121 utilizes the information from all of the domains received from the probes to analyze the overall condition of WAN 119 and also the potential problems that may exist within a domain. For example, if the majority of the domains are having trouble communicating with a particular domain, this may indicate a problem within WAN 119, or it may indicate that the domain itself is experiencing some type of problem. Once this is determined, server 121 can utilize other diagnostic tools to further detect the problem.

If the user of IP phone 103 becomes active on IP phone 103 while it is a probe, IP phone 103 may broadcast to IP phones 104-107 the fact that it is no longer the probe. For convenience, this message is called a "goodbye" message.

Consider now how IP phone 103 becomes the probe. After the first predefined period has passed, since IP phone 103 ended an active call, it transmits its ID number, waits for a second predefined period which for the sake of this example is assumed to be 10 seconds, to determine if any other idle IP phone in the last predefined time interval has transmitted an ID number lower than the ID number of IP phone 103. In another embodiment, IP phone 103 will become the probe if it has the highest ID number that has been broadcast among the idle IP phones of domain 101.

Figure 2:
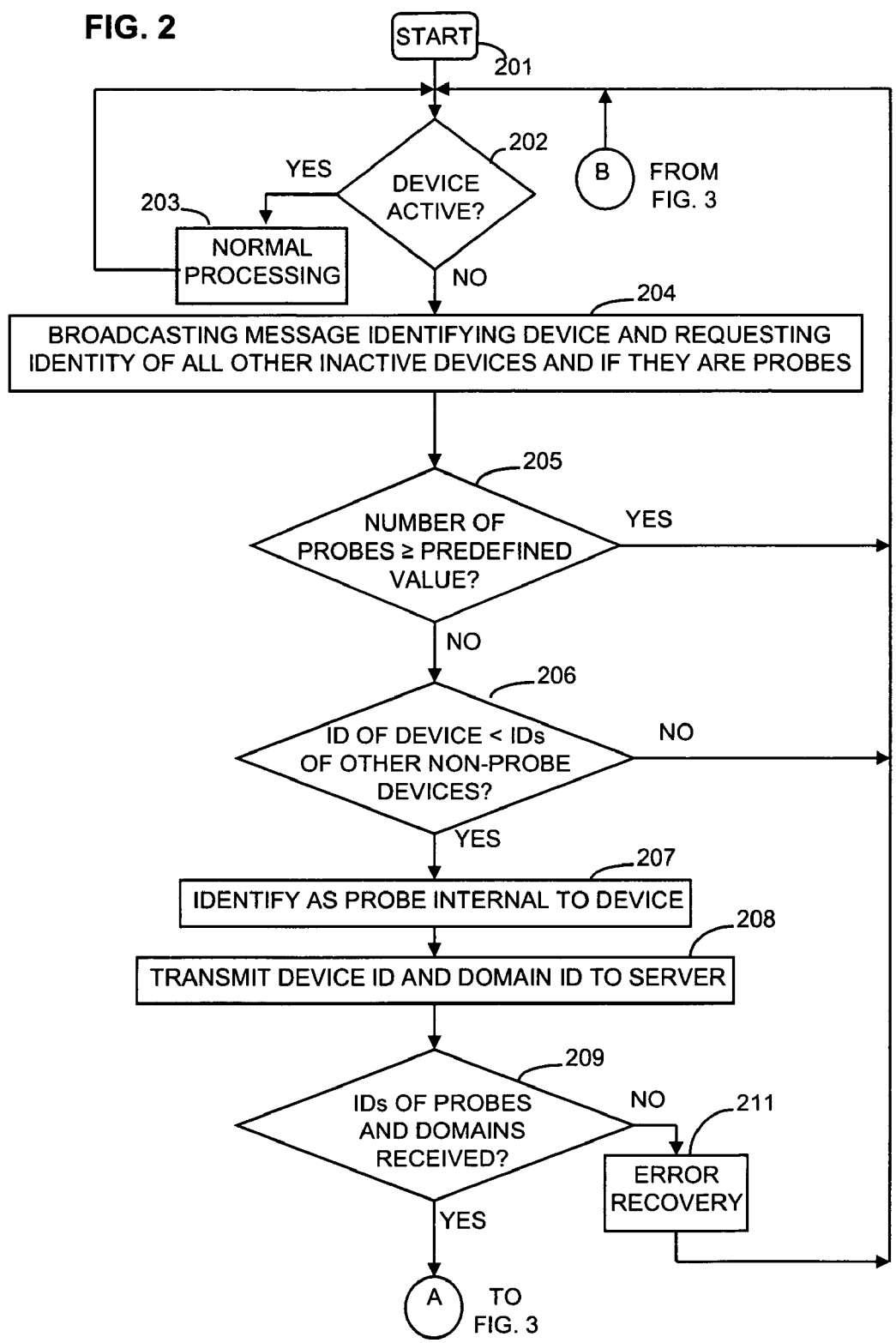
FIGS. 2 and 3 illustrate, in flowchart form, operations performed by an embodiment of a device.
Figure 3:
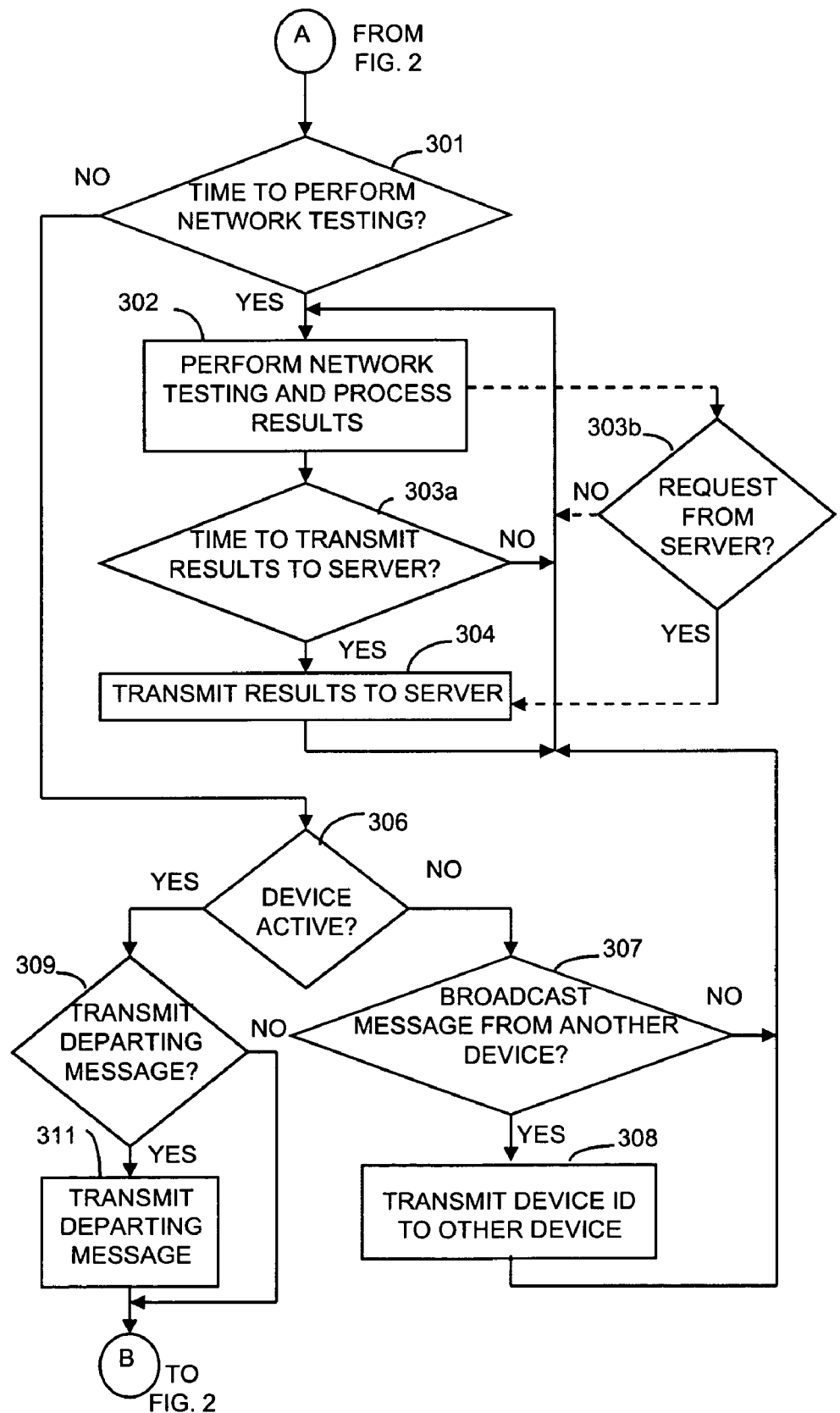

FIGS. 2 and 3 illustrate, in flowchart form, operations performed by an embodiment of a device interconnected to a digital network. As previously noted, such a device may be an IP telephone, PDA, or other digital endpoints connected to a digital network. FIG. 1 illustrates such a device as an IP telephone. After being started in block 201, decision block 202 determines if the device is active. If the answer is yes, block 203 performs normal processing before returning control back to decision block 202. If the answer in decision block 202 is no, block 204 transmits a broadcast message identifying the device and requesting the identity of all other inactive devices and requesting that these inactive devices specify whether they are performing test probe functions (also referred to as a test probe). After execution of block 204, decision block 205 receives the messages back from the other inactive devices and determines if the number of test probes responding is greater than a predefined value. Note, if only one test probe is allowed to be functioning, the predefined value would be one. Note, that a test probe is simply an inactive device performing test probe functions.

If the answer in decision block 205 is yes, control is transferred back to decision block 202 since the required number of test probes are functioning. If the answer in decision block 205 is no, decision block 206 determines if the identification of the present device is less than the identification number of the other non-probe devices. One skilled in the art could readily see that the embodiment would also function if the identification number of the device was greater than the identification numbers of the other non-probe devices. If the answer in decision block 206 is no, control is transferred back to decision block 202.

If the decision in decision block 206 is yes, block 207 stores a flag within the device specifying or identifying it as a test probe before transferring control to block 208. The latter block transmits the device ID number and domain ID number of the device to the server which is controlling the performance of the testing on the network. In response to the receipt of this information, the server transmits to the device the identification numbers of the other test probes and the domains where they reside. In one embodiment, server 121 will transmit test information defining the domains to be tested, the schedule of the tests, and the schedule that the probe will report test results back to server 121 along with the identities of the other probes. Decision block 209 determines whether or not this information has been received from the server. If the answer is no, block 211 performs error recovery before transferring control back to decision block 202.

If the answer in decision block 209 is yes, control is transferred to decision block 301 of FIG. 3. The latter decision block determines if it is time to perform the network testing that is to be performed by the device. If the answer is yes, block 302 performs the network testing and processes the results so as to form statistical results or any other type of results that one skilled in the art may envision. After execution of block 302, control is transferred to decision block 303a. The latter decision block determines if it is time to transmit the results to the server. If the answer is no, control is transferred back to block 302. If the answer is yes, control is transferred to block 304. In another embodiment of the invention, the device does not periodically transmit the results to the server rather, the server polls the device for these results. In this embodiment, control is transferred from block 302 to decision block 303b. The latter decision block determines if a request has been received from the server. If the answer is no, control is transferred back to block 302. If the answer is yes, control is transferred to block 304 which transmits the results to the server before transferring control back to block 302.

Returning to decision block 301, if the answer in decision block 301 is no, control is transferred to decision block 306. Decision block 306 determines if the device has become active and is performing its normal functions. If the answer is yes, control is transferred to decision block 309 which determines whether or not to transmit a departing message to the other test probes within the domain before the device ceases to perform the test probe functions. If the answer is no, control is transferred back to decision block 202 of FIG. 2. If the answer is yes in decision block 309, block 311 transmits the departing message to the other devices performing the test probe functions before transferring control back to decision block 202. Whether the device transmits or does not transmit the departing message represents different embodiments of the operations illustrated in FIG. 3. If the answer is no in decision block 306, control is transferred to decision block 307 which determines if a broadcast message has been received from another device requesting the present device's ID number. If the answer is no in decision block 307, control is transferred back to block 302. If the answer is yes in decision block 307, control is transferred to block 308 which transmits the present device's ID number before transferring control back to block 302.

Figure 4:
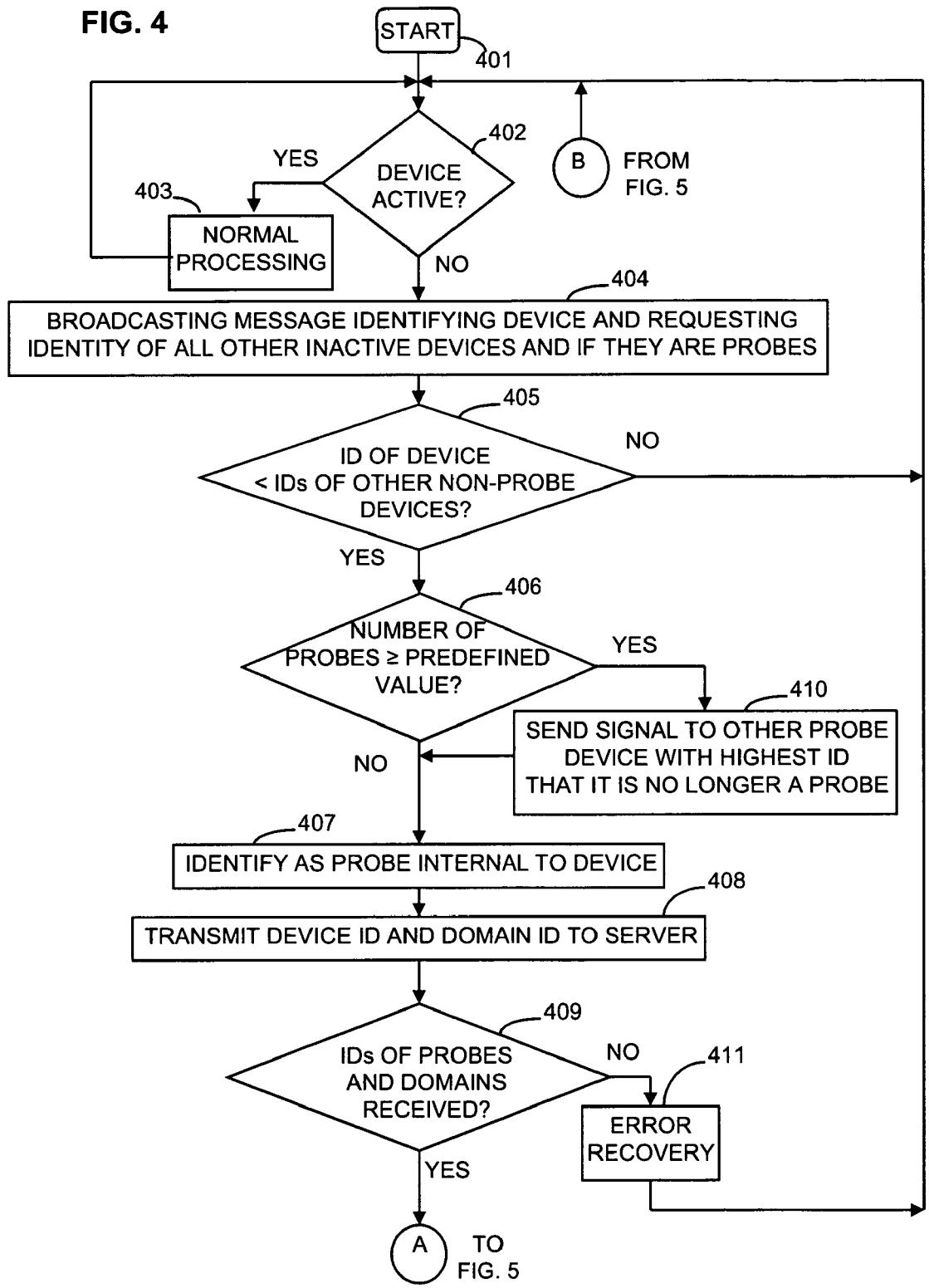
FIGS. 4 and 5 illustrate, in flowchart form, operations performed by another embodiment of a device.
Figure 5:
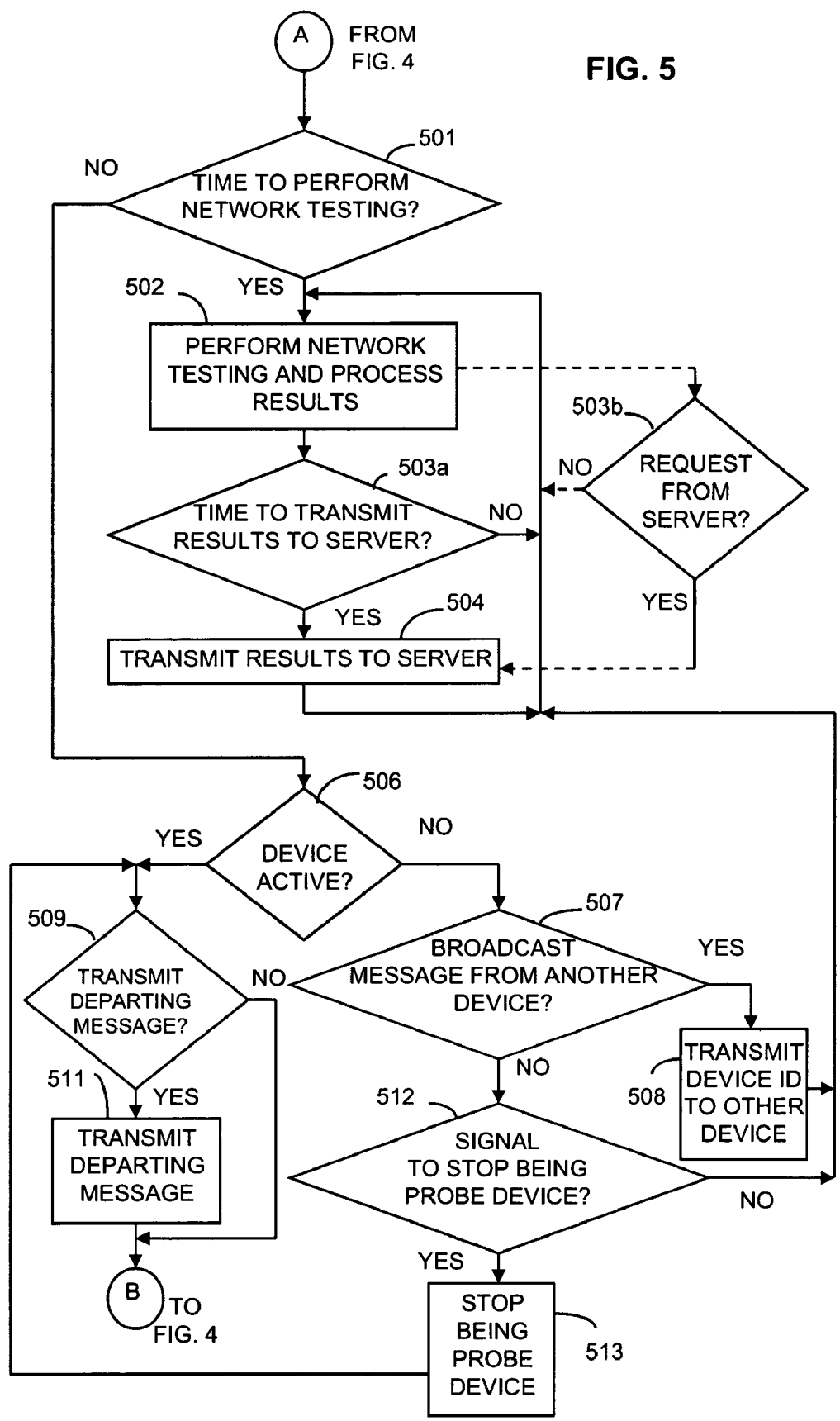

FIGS. 4 and 5 illustrate, in flowchart form, operations performed by another embodiment of a device interconnected to a digital network. As previously noted, such a device may be an IP telephone, PDA, or other digital endpoints connected to a digital network. FIG. 1 illustrates such a device as an IP telephone. After being started in block 401, decision block 402 determines if the device is active. If the answer is yes, block 403 performs normal processing before returning control back to decision block 402. If the answer in decision block 402 is no, block 404 transmits a broadcast message identifying the device and requesting the identity of all other inactive devices and requesting that these inactive devices specify whether they are performing test probe functions (also referred to as a test probe). After execution of block 404, decision block 405 receives messages from the other inactive devices and determines if the identification of the present device is less than the identification number of the other non-probe devices. Note, that a test probe is simply an inactive device performing test probe functions. One skilled in the art could readily see that the embodiment would also function if the identification number of the device was greater than the identification numbers of the other non-probe devices.

If the answer in decision block 405 is no, control is transferred back to decision block 402 since there is another inactive device having a lower ID that should start to perform the test probe functions. If the answer in decision block 405 is yes, decision block 406 determines if the number of test probes responding is greater than a predefined value. Note, if only one test probe is allowed to be functioning, the predefined value would be one. If the answer in decision block 406 is yes, control is transferred to block 410 which signals the responding device having the highest ID number to stop being a test probe. After execution of block 410, control is transferred to block 407.

If the decision in decision block 406 is no, block 407 stores a flag within the device specifying or identifying it as a test probe before transferring control to block 408. The latter block transmits the device ID number and domain ID number of the device to the server which is controlling the performance of the testing on the network. In response to the receipt of this information, the server transmits to the device the identification numbers of the other test probes and the domains where they reside. In one embodiment, server 121 will transmit test information defining the domains to be tested, the schedule of the tests, and the schedule that the probe will report test results back to server 121 along with the identities of the other probes. Decision block 409 determines whether or not this information has been received from the server. If the answer is no, block 411 performs error recovery before transferring control back to decision block 402.

If the answer in decision block 409 is yes, control is transferred to decision block 501 of FIG. 5. The latter decision block determines if it is time to perform the network testing that is to be performed by the device. If the answer is yes, block 502 performs the network testing and processes the results so as to form statistical results or any other type of results that one skilled in the art may envision. After execution of block 502, control is transferred to decision block 503a. The latter decision block determines if it is time to transmit the results to the server. If the answer is no, control is transferred back to block 502. If the answer is yes, control is transferred to block 504. In another embodiment of the invention, the device does not periodically transmit the results to the server rather, the server polls the device for these results. In this embodiment, control is transferred from block 502 to decision block 503b. The latter decision block determines if a request has been received from the server. If the answer is no, control is transferred back to block 502. If the answer is yes, control is transferred to block 504 which transmits the results to the server before transferring control back to block 502.

Returning to decision block 501, if the answer in decision block 501 is no, control is transferred to decision block 506. Decision block 506 determines if the device has become active and is performing its normal functions. If the answer is yes, control is transferred to decision block 509 which determines whether or not to transmit a departing message to the other test probes within the domain before the device ceases to perform the test probe functions. If the answer is no, control is transferred back to decision block 402 of FIG. 4. If the answer is yes in decision block 509, block 511 transmits the departing message to the other devices performing the test probe functions before transferring control back to decision block 402. Whether the device transmits or does not transmit the departing message represents different embodiments of the operations illustrated in FIG. 5.

Returning to decision block 506, if the answer is no in decision block 506, control is transferred to decision block 507 which determines if a broadcast message has been received from another device requesting the present device's ID number. If the answer is no in decision block 507, control is transferred to decision block 512. The latter decision block determines if a signal has been received from another device to stop being a test probe. If the answer is yes, block 513 stops the test probe operations within the present device before transferring control to decision block 509. If the answer is no in decision block 512, control is returned to block 502. Returning to decision block 507, if the answer is yes in decision block 507, control is transferred to block 508 which transmits the present device's ID number before transferring control back to block 502.

Figure 6:
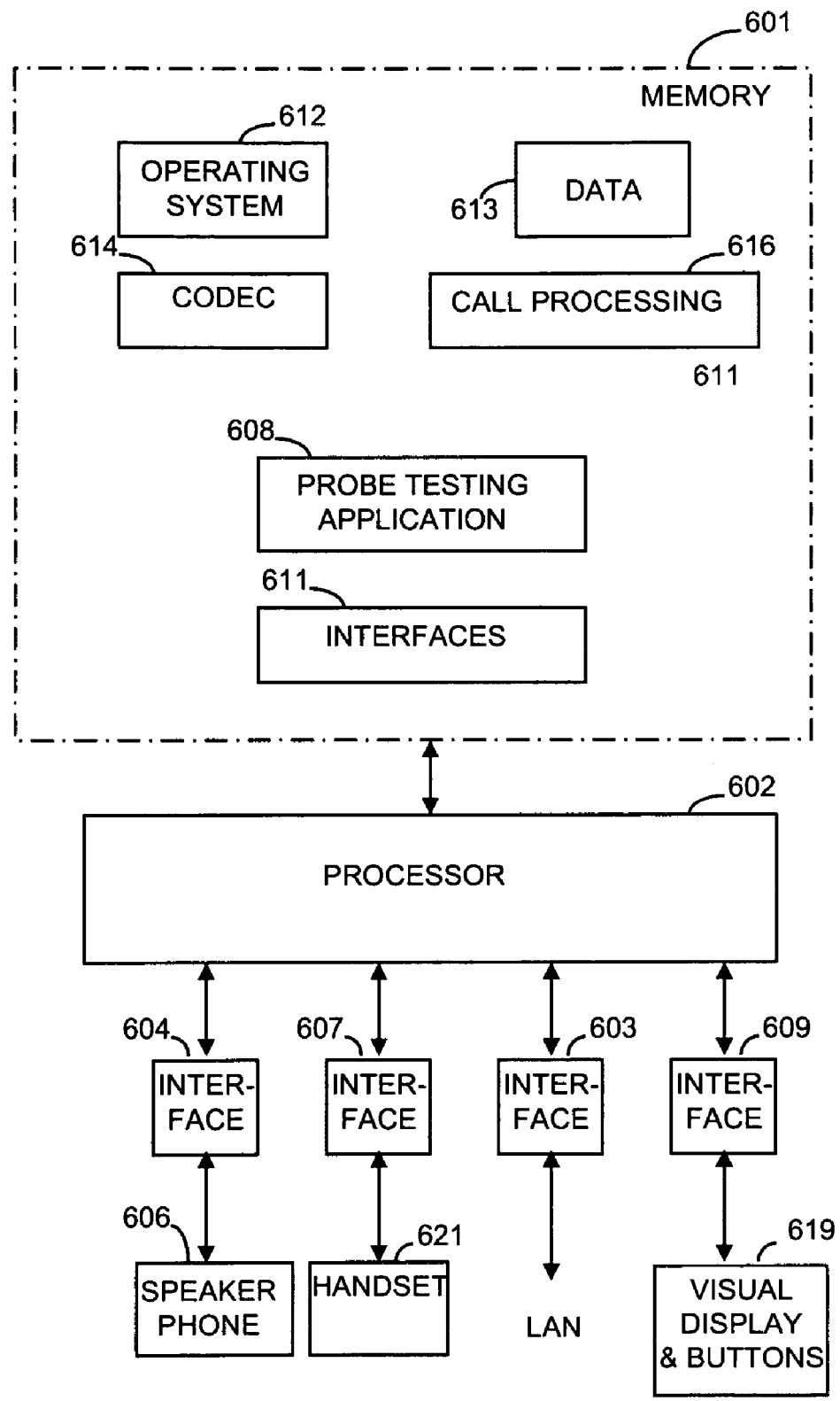
FIG. 6 illustrates, in block diagram form, an IP telephone.

FIG. 6 illustrates, in block diagram form, one embodiment of an IP telephone such as IP telephone set 103. Processor 602 provides the overall control for the functions of IP telephone set by executing programs and using data in memory 601. Processor 602 connects to a WAN or LAN such as LAN 102 via interface 603. Processor 602 interfaces to handset 621 via interface 607, interfaces to speakerphone 606 via interface 604, and interfaces to visual display and buttons 619 via interface 609. Visual display and buttons 619 are indicators, buttons keypad, and display for an IP telephone as are well known in the art. Processor 602 performs the operations of the IP telephone set by executing the routines illustrated in memory 601.

Operating system 612 provides the overall control and the necessary protocol operations. Operating system routine 612 provides all control functions required to implement the TCP/IP protocol as is well known to those skilled in the art. Data is stored in data block 613. CODEC 614 encodes and decodes audio information for communication between handset 621 or speakerphone 606 and LAN 102. Overall control of the call processing is performed by the IP telephone set under the control of call processing routine 616. The communication and control of the various interfaces illustrated in FIG. 6 is provided by interfaces routine 611. Probe testing application 608 provides control for the probe testing operations as illustrated in FIGS. 2-5 with network test results and other data being stored in data 613.

When the operations of a device are implemented in software, it should be noted that the software can be stored on any computer-readable medium for use by or in connection with any computer related system or method. In the context of this document, a computer-readable medium is an electronic, magnetic, optical, or other physical device or means that can contain or store a computer program for use by or in connection with a computer related system or method. The device can be embodied in any computer-readable medium for use by or in connection with an instruction execution system, apparatus, or device such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device. For example, the computer-readable medium can be, but is not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, for instance, via optical scanning of the paper or other medium, then compiled, interpreted or otherwise processed in a suitable manner if necessary, and then stored in a computer memory.

In an alternative embodiment, where the device is implemented in hardware, the device can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Of course, various changes and modifications to the illustrated embodiments described above will be apparent to those skilled in the art. These changes and modifications can be made without departing from the spirit and scope of the invention and without diminishing its intended advantages. It is therefore intended that such changes and modifications be covered by the following claims except insofar as limited by the prior art.

What is claimed is:

1. A method of testing a digital network having a plurality of subnetworks, comprising the steps of:
    determining by one of a plurality of user endpoint devices assigned to one of the plurality of subnetworks upon the one of the plurality of user endpoint devices being idle that the one of the plurality of user endpoint devices should perform the functions of a testing user endpoint device for the one of the plurality of subnetworks;
    identifying the one of plurality of user endpoint devices to a server as a testing user endpoint device;
    obtaining the identifies of other testing user endpoint devices in other ones of the plurality of subnetworks from the server; and
    testing the network by transmission of test packets to other ones of the testing user endpoint devices in the other ones of the plurality of subnetworks;
    wherein the step of determining comprises the steps of recognizing by the one of the plurality of user endpoint devices that the one of the plurality of user endpoint devices is idle; and negotiating with the other ones of the plurality of user endpoint devices of the one of the plurality of subnetworks to become the testing user endpoint device for the one of the plurality of subnetworks.

2. The method of claim 1 wherein the server may be one of a distributed system of servers.

3. The method of claim 1 wherein the plurality of user endpoint devices are telecommunication devices.

4. The method of claim 3 wherein the step of obtaining comprises the step of receiving test information comprises at least one of specifying at least one of the subnetworks to be tested, testing schedule, and reporting schedule.

5. The method of claim 1 wherein the step of obtaining comprises the step of the one of the plurality of user endpoint devices requesting the identifies of the other testing user endpoint devices from the server.

6. The method of claim 1 wherein the step of obtaining comprises the step of the server periodically transmitting the identifies of all testing user endpoint devices to all user endpoint devices of the network.

7. The method of claim 1 wherein there may be a number of testing user endpoint devices functioning in the one of the plurality of subnetworks.

8. The method of claim 1 wherein the step of negotiating comprises the steps of exchanging identification numbers among idle ones of the plurality of user endpoint devices of the one of plurality of subnetworks;
analyzing the identification numbers to determine whether the one of the plurality of user endpoint devices should become the testing user endpoint device; and
informing the other ones of the plurality of user endpoint devices that the one of the plurality of user endpoint devices is becoming the testing user endpoint device based on the step of analyzing coming to this result.

9. The method of claim 8 wherein the step of informing comprises transmitting a message to the current testing user endpoint device to stop performing the operations of a testing user endpoint device.

10. The method of claim 8 wherein the step of analyzing comes to this result if the one of the plurality of user endpoint devices has a lower identification number than the identification numbers of the idle ones of the plurality of user endpoint devices.

11. An apparatus for implementing the method of claim 10.

12. The method of claim 8 wherein the step of analyzing comes to this result if the one of the plurality of user endpoint devices has a higher identification number than the identification numbers of the idle ones of the plurality of user endpoint devices.

13. An apparatus for implementing the method of claim 8.

14. The method of claim 1 wherein the step of negotiating comprises the steps of exchanging identification numbers among idle ones of the plurality of user endpoint devices of the one of plurality of subnetworks;
analyzing the identification numbers to determine whether the one of the plurality of user endpoint devices should become the testing user endpoint device; and
informing the other ones of the plurality of user endpoint devices that the one of the plurality of user endpoint devices is becoming the testing user endpoint device based on the step of analyzing coming to this result and no other one of the plurality of user endpoint devices currently performing the operations of the testing user endpoint device for the one of the plurality of subnetworks.

15. The method of claim 14 wherein the step of analyzing comes to this result if the one of the plurality of user endpoint devices has a lower identification number than the identification numbers of the idle ones of the plurality of user endpoint devices.

16. The method of claim 14 wherein the step of analyzing comes to this result if the one of the plurality of user endpoint devices has a higher identification number than the identification numbers of the idle ones of the plurality of user endpoint devices.

17. An apparatus for implementing the method of claim 14.

18. The method of claim 1 wherein the plurality of user endpoint devices are a plurality of IP telephones.

19. The method of claim 1 wherein the step of testing comprises the step of transmitting test results to the server.

20. The method of claim 1 wherein the step of testing comprises the step of requesting by the server test results from the one of the plurality of user endpoint devices.

21. The method of claim 1 wherein the network is an IP network and the test packets are RTP packets that are used to ascertain that packets can be sent through the IP network to the other ones of testing user endpoint devices.

22. The method of claim 1 wherein the network is an IP network and the test packets use testing techniques such as at least one of traceroute, pinging RTP, SIP, H323 and RTCP that are used to ascertain network conditions of the IP network.

23. The method of claim 1 further comprises the steps of detecting when the one of the plurality of user endpoint devices becomes active; and
ceasing to perform the testing user endpoint device operations by the one of the plurality of user endpoint devices.

24. The method of claim 23 wherein the step of ceasing further comprises the step of transmitting a message to the other ones of the plurality of user endpoint devices indicating that the one of the plurality of user endpoint devices will no longer perform the operations of the testing user endpoint device.

25. An apparatus for implementing the method of claim 1.

26. A processor-readable medium for testing a digital network having a plurality of subnetworks, comprising processor-executable instructions configured:
determining by one of a plurality of user endpoint devices assigned to one of the plurality of subnetworks upon the one of the plurality of user endpoint devices being idle that the one of the plurality of user endpoint devices should perform the functions of a testing user endpoint device for the one of the plurality of subnetworks;
identifying the one of plurality of user endpoint devices to a server as a testing user endpoint device;
obtaining the identifies of other testing user endpoint devices in other ones of the plurality of subnetworks from the server; and
testing the network by transmission of test packets to other ones of the testing user endpoint devices in the other ones of the plurality of subnetworks;
wherein determining comprises recognizing by the one of the plurality of user endpoint devices that the one of the plurality of user endpoint devices is idle; and negotiating with the other ones of the plurality of user endpoint devices of the one of the plurality of subnetworks to become the testing user endpoint device for the one of the plurality of subnetworks.

27. The processor-readable medium of claim 26 wherein the server may be one of a distributed system of servers.

28. The processor-readable medium of claim 26 wherein the plurality of user endpoint devices are telecommunication devices.

29. The processor-readable medium of claim 26 wherein the obtaining comprises the one of the plurality of user endpoint devices requesting the identifies of the other testing user endpoint devices from the server.

30. The processor-readable medium of claim 29 wherein the step of obtaining comprises the step of receiving test information comprises at least one of specifying at least one of the subnetworks to be tested, testing schedule, and reporting schedule.

31. The processor-readable medium of claim 26 wherein the obtaining comprises the server periodically transmitting the identifies of all testing user endpoint devices to all user endpoint devices of the network.

32. The processor-readable medium of claim 26 wherein there may be a number of testing user endpoint devices functioning in the one of the plurality of subnetworks.

33. The processor-readable medium of claim 26 wherein the negotiating comprises exchanging identification numbers among idle ones of the plurality of user endpoint devices of the one of plurality of subnetworks;
 analyzing the identification numbers to determine whether the one of the plurality of user endpoint devices should become the testing user endpoint device; and
 informing the other ones of the plurality of user endpoint devices that the one of the plurality of user endpoint devices is becoming the testing user endpoint device based on the analyzing coming to this result.

34. The processor-readable medium of claim 33 wherein the informing comprises transmitting a message to the current testing user endpoint device to stop performing the operations of a testing user endpoint device.

35. The processor-readable medium of claim 33 wherein the analyzing comes to this result if the one of the plurality of user endpoint devices has a lower identification number than the identification numbers of the idle ones of the plurality of user endpoint devices.

36. The processor-readable medium of claim 33 wherein the analyzing comes to this result if the one of the plurality of user endpoint devices has a higher identification number than the identification numbers of the idle ones of the plurality of user endpoint devices.

37. The processor-readable medium of claim 26 wherein the negotiating comprises exchanging identification numbers among idle ones of the plurality of user endpoint devices of the one of plurality of subnetworks;
 analyzing the identification numbers to determine whether the one of the plurality of user endpoint devices should become the testing user endpoint device; and
 informing the other ones of the plurality of user endpoint devices that the one of the plurality of user endpoint devices is becoming the testing user endpoint device based on the analyzing coming to this result and no other one of the plurality of user endpoint devices currently performing the operations of the testing user endpoint device for the one of the plurality of subnetworks.

38. The processor-readable medium of claim 37 wherein the analyzing comes to this result if the one of the plurality of user endpoint devices has a lower identification number than the identification numbers of the idle ones of the plurality of user endpoint devices.

39. The processor-readable medium of claim 37 wherein the analyzing comes to this result if the one of the plurality of user endpoint devices has a higher identification number than the identification numbers of the idle ones of the plurality of user endpoint devices.

40. The processor-readable medium of claim 26 wherein the plurality of user endpoint devices are a plurality of IP telephones.

41. The processor-readable medium of claim 26 wherein the testing comprises transmitting test results to the server.

42. The processor-readable medium of claim 26 wherein the testing comprises requesting by the server test results from the one of the plurality of user endpoint devices.

43. The processor-readable medium of claim 26 wherein the network is an IP network and the test packets are RTP packets that are used to ascertain that packets can be sent through the IP network to the other ones of testing user endpoint devices.

44. The processor-readable medium of claim 26 wherein the network is an IP network and the test packets use testing techniques such as at least one of traceroute, pinging RTP, SIP, H323 and RTCP that are used to ascertain network conditions of the IP network.

45. The processor-readable medium of claim 26 further comprises detecting when the one of the plurality of user endpoint devices becomes active; and
 ceasing to perform the testing user endpoint device operations by the one of the plurality of user endpoint devices.

46. The processor-readable medium of claim 45 wherein the ceasing further comprises transmitting a message to the other ones of the plurality of user endpoint devices indicating that the one of the plurality of user endpoint devices will no longer perform the operations of the testing user endpoint device.

\* \* \* \* \*